UNITED STATES PATENT OFFICE.

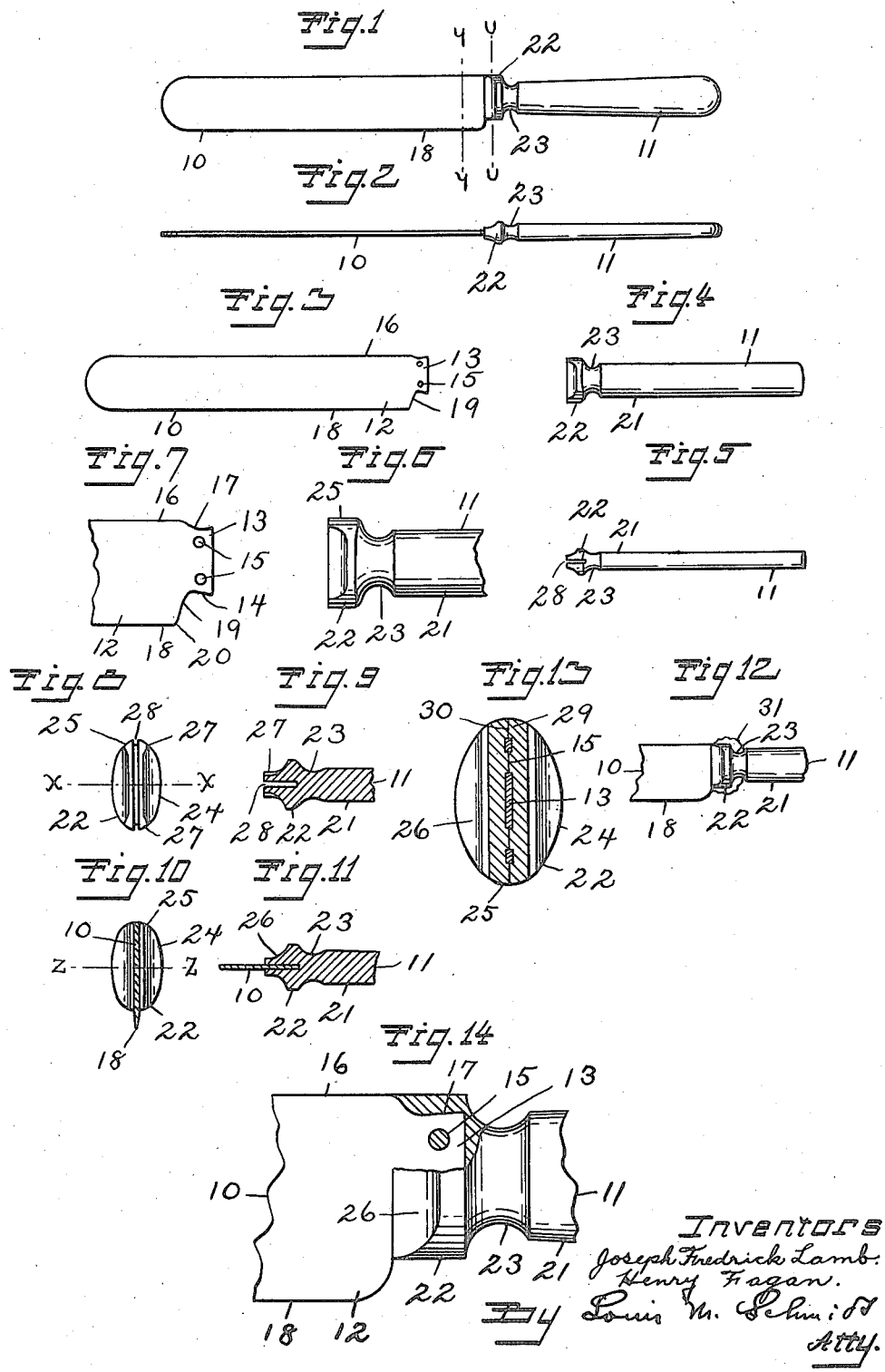

JOSEPH FREDRICK LAMB AND HENRY FAGAN, OF NEW BRITAIN, CONNECTICUT, ASSIGNORS TO LANDERS, FRARY & CLARK, OF NEW BRITAIN, CONNECTICUT, A CORPORATION.

PROCESS OF MAKING TABLE-KNIVES AND PRODUCT THEREOF.

1,212,969.   Specification of Letters Patent.   Patented Jan. 16, 1917.

Continuation of application Serial No. 783,576, filed August 7, 1913. This application filed June 23, 1916. Serial No. 105,464.

*To all whom it may concern:*

Be it known that we, JOSEPH FREDRICK LAMB and HENRY FAGAN, citizens of the United States, residing at New Britain, in the county of Hartford and State of Connecticut, have invented certain new and useful Improvements in Processes of Making Table-Knives and Products Thereof, of which the following is a specification.

Our invention relates to improvements in process of making table knives and product thereof, and the object of our improvement is to produce a process that is suitable for securing handles to the blades of knives for table ware, that is operative without heating the parts to be connected, and that will produce goods that will satisfactorily meet the requirements of ordinary and usual use both as to appearance and utility, the said invention being identical with that disclosed in our corresponding application Serial No. 783,576, filed Aug. 7, 1913, of which the present application is a continuation.

In the accompanying drawing:—Figure 1 is a side elevation of a table knife made by our improved process. Fig. 2 is a plan view of the same. Fig. 3 is a side elevation of the blade shown in Fig. 1. Fig. 4 is a similar view of the blank for the handle member before assembling. Fig. 5 is a plan view of the same. Fig. 6 is a side elevation on an enlarged scale of the head portion of the same. Fig. 7 is a similar view of the tang and adjacent portion of the blade. Fig. 8 is an end elevation of the blank for the handle member shown in Fig. 6. Fig. 9 is a sectional view on the line $x\ x$ of Fig. 8. Fig. 10 is a sectional view on the line $y\ y$ of Fig. 1. Fig. 11 is a sectional view on the line $z\ z$ of Fig. 10. Fig. 12 is a side elevation, on the same scale as Fig. 1, of the parts after assembling and before trimming. Fig. 13 is a sectional view, on the line $u\ u$ of Fig. 1, and on a considerably enlarged scale. Fig. 14 is a side elevation of certain parts shown in Fig. 1, in part broken away and in section.

The table knife shown in Fig. 1 is composed of a blade member 10 and a handle member 11. The blade member 10 before being connected to the handle member 11 is shaped to the desired contour and hardened and tempered and comprises at one end the body portion 12, and at the other end the shank or tang 13. The body portion 12 is of appreciable width, having approximately parallel top and bottom edges. The shank 13 is also of appreciable width, though somewhat narrower than the body portion 12, and is relatively quite short, being in fact very much shorter in length, along the axis of the knife, than in width. The lateral edges 14 of the shank 13 are divergent from the junction of the same with the body portion 12 of the blade outwardly, so that the shank is generally in the form of an enlargement or head connected to the body portion 12 by means of a reduced form. The shank 13 may furthermore be provided with a plurality of holes 15 positioned along a transverse line or axis, as shown there being two in number.

Because of the difference in width between the shank and blade one or both of the lateral edges of the blade must overhang the lateral edges 14 of the shank. We prefer to position the shank relatively to the longitudinal axis of the blade so that both lateral edges of the blade will overhang the edges 14 of the shank, and also to position the shank in off-set relation to the blade toward the top or back edge 16, as shown. Thus as best shown in Fig. 7, the lateral edge 14 at the back will be off-set relatively to the extension of the line of the back edge 16 of the blade, as shown at 17, the effect being due to the cutting away of the corner at 17 of the material of the blank, it being understood however that such cutting away is of peculiar form, due to the inclined position of the back edge 14 of the shank 13.

On the side of the front or cutting edge 18 of the blade the cutting away of the corner 19 is of appreciably greater extent, the transverse line of the cut terminating in a rounded corner at the heel 20 of the blade. The blade member 10 is made of sheet material, the shank 13 being of moderate thickness. The cut-away corner 17 is completely filled by material from the blank of the handle member 11 in the operation of assembling to be described, so that the back of the filling material is flush with the back edge of the blade 16, and the corner 18 is partially filled by substantially an equal amount of material as that at the corner 17, and the holes 15 if used are also filled.

The handle member 11 comprises the handle proper 21 at one end, the head 22 at the other end, and a reduced neck 23 connecting the said handle proper 21 and head 22. The head 22 is of about the same length as the shank 13, is of slightly greater width than the said shank 13, is generally flat, and may have any form desired to give a bolster effect.

The lateral edge portions 23 are rounded. The flat face portions comprise ribs 24 at the outer side and in the finished article a sloping or generally concave portion 26 that extends on each side from the rib 24 to the extreme outer edge.

In order to provide for a uniformity of the form of the sloping portion 26 in the finished article as mentioned and to avoid any irregularity of the contour as described, I provide in the blank for the handle member 11 as shown in Fig 8, surplus material in the lateral edge portions of the head 22, and which material is shown at 27 in the form of enlargements or protuberances that extend above the general surface of the sloping portions 26. The head 22 is furthermore provided with a transverse, central slot 28 that is a fit for the shank 13.

In assembling the parts, the shank 13 is inserted centrally in the slot 28 and cold pressure is applied to the head 22 by means of suitable dies, whereby the lateral edge portions are closed over the lateral edges 14 of the shank 13, the enlargements 27 in the sloping portions being displaced and reduced to correspond to the form of the adjacent portions of the periphery, the filling portions 29 that are forced over the corners 17 and 18 meeting along the central, axial plane, as shown at 30, Fig. 13, and at the same time the holes 15 are filled, as shown. In this operation a fin 31 is formed, as shown in Fig. 12, which is later trimmed off, the metal flowing under pressure so as to form a firm connection.

We claim as our invention:—

1. The process of securing handles to the blades of table cutlery comprising providing a blade member having a shank at one end, providing a handle member having a head at one end, the said head being wider than the said shank and having a transverse slot extending for the entire width of the said head, inserting the said shank in the said slot, and compressing the said head so as to close the end wall portions of the said slot over against the lateral edges of the said shank.

2. The process of securing handles to the blades of table cutlery comprising providing a blade member having a shank at one end, providing a handle member having a head at one end, the said head being wider than the said shank and having a transverse slot extending for the entire width of the said head, inserting the said shank in the said slot, compressing the said head so as to close the end wall portions of the said slot over against the lateral edges of the said shank, and the said lateral edges of the said shank being divergent outwardly from the junction with the body portion of the said blade member.

3. The process of securing handles to the blades of table cutlery comprising providing a blade member having a shank at one end, providing a handle member having a head at one end, the said head being wider than the said shank and having a transverse slot extending for the entire width of the said head, inserting the said shank in the said slot, compressing the said head so as to close the end wall portions of the said slot over against the lateral edges of the said shank, and the said shank having a plurality of holes into which material of the said head is forced.

4. The process of securing handles to the blades of table cutlery comprising providing a blade member having a shank at one end and a handle member having a head at one end, the said shank having divergent lateral edges and being provided with a plurality of holes, the said head being wider than the said shank and having a transverse slot, inserting the said shank centrally in the said slot, and compressing the material of the said head so as to inclose the said shank.

5. The process of securing a handle to a blade, comprising providing a blade member having a shank at one end and a handle member blank having a head at one end, the said head being wider than the said shank and having a transverse slot, inserting the said shank centrally in the said slot and compressing the said head so as to form a bolster that incloses the said shank, and the said head being of fanciful form at the middle portions of the lateral faces and having protuberances at the edge portions of the said lateral faces whereby material is provided for bringing the said edge portions into conformity with the said fanciful form in the finished bolster.

6. A table knife having a blade member provided with a shank at one end, and a handle member having a head at one end, the said shank being positioned in the said head, and the said head at the junction with the said shank being divided and comprising portions at the middle that are opposed to the said shank and portions at the lateral edges of the said shank that are opposed one to the other.

JOSEPH FREDRICK LAMB.
HENRY FAGAN.

Witnesses:
 CATHERINE SCANLON,
 FRANK T. PUNDERSON.